United States Patent

[11] 3,543,781

| [72] | Inventor | John A. C. Kentfield<br>London SW 19, England (7 Mortimer Lodge, Albert Drive, Wimbledon, England) |
|---|---|---|
| [21] | Appl. No. | 740,352 |
| [22] | Filed | June 26, 1968 |
| [45] | Patented | Dec. 1, 1970 |

[54] FLUID RECTIFIERS
11 Claims, 13 Drawing Figs.

| [52] | U.S. Cl. | 137/81.5 |
|---|---|---|
| [51] | Int. Cl. | F15c 4/00 |
| [50] | Field of Search | 137/8.15 |

[56] References Cited
UNITED STATES PATENTS

| 1,329,559 | 2/1920 | Tesla | 137/81.5X |
|---|---|---|---|
| 2,037,940 | 4/1936 | Stalker | 138/39 |
| 2,525,399 | 10/1950 | Collison | 138/39X |
| 3,076,480 | 2/1963 | Vicard | 138/39 |
| 3,194,253 | 7/1965 | Havee | 137/81.5 |
| 3,216,455 | 11/1965 | Cornell et al. | 138/39 |
| 3,351,091 | 11/1967 | Chambert | 138/39X |
| 3,411,520 | 11/1968 | Bowles | 137/81.5 |
| 3,425,433 | 2/1969 | Moore | 137/81.5 |

*Primary Examiner*—Samuel Scott
*Attorney*—Mason, Mason & Albright

ABSTRACT: A fluid rectifier includes three ducts meeting at an intersection and the cross section of each duct adjacent the intersection is substantially the same. In each embodiment either a baffle or an auxiliary fluid flow serves to deflect a main flow of fluid in such a way that under different operating conditions the flow path through the rectifier differs. The rectifier can be used for example in a crop drier, a combustion system or as a safety device to prevent damage to delicate equipment as a result of flow reversal in a duct.

Patented Dec. 1, 1970 3,543,781
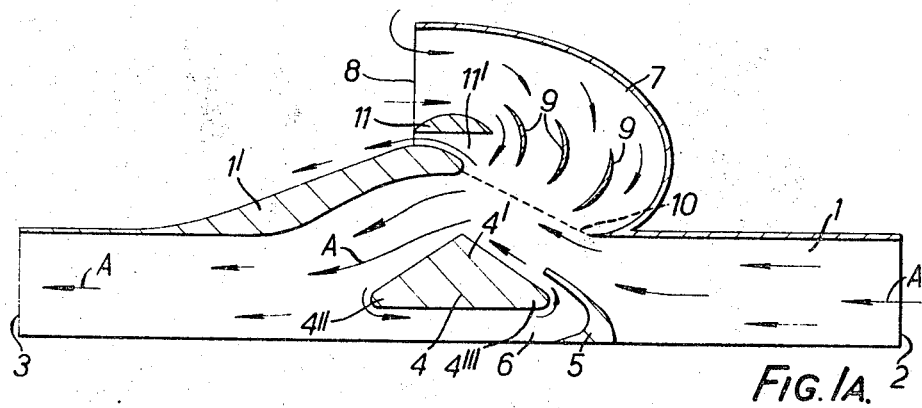
FIG. IA.
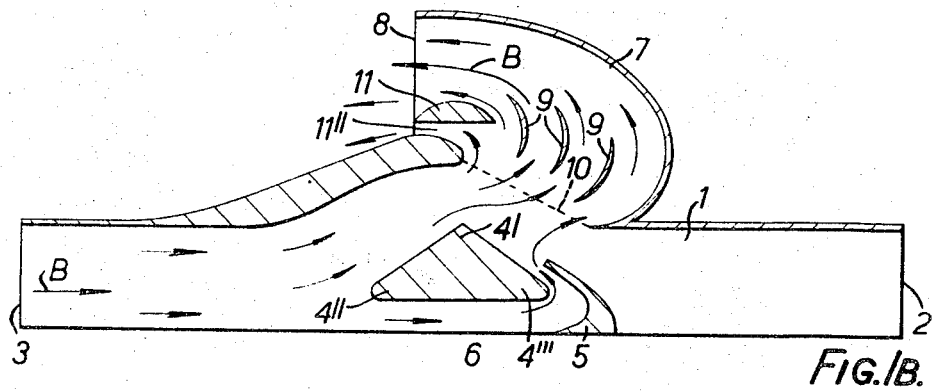
FIG. IB.
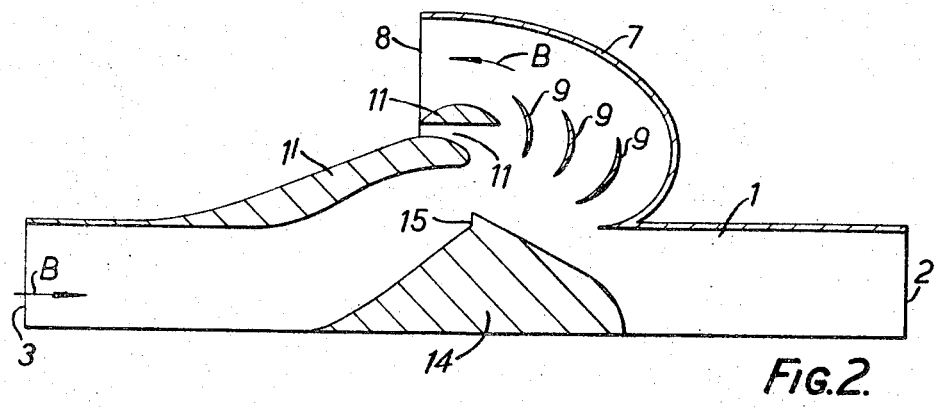
FIG. 2.
INVENTOR
JOHN A. C. KENTFIELD
BY
Mason, Mason & Albright
ATTORNEYS Patented Dec. 1, 1970

INVENTOR
JOHN A. C. KENTFIELD
BY
Mason, Mason & Albright
ATTORNEYS

Patented Dec. 1, 1970

INVENTOR
JOHN A. C. KENTFIELD
BY
Mason Mason & Albright
ATTORNEYS

FLUID RECTIFIERS

BACKGROUND OF THE INVENTION

1. Field of the Invention

The present invention relates to fluid rectifiers.

The term "fluid rectifier" is used herein to mean a device including no moving mechanical parts which offers a high resistance to fluid flow in one direction.

2. Description of the Prior Art

Various proposals have been put forward for fluid flow rectifiers and in one such rectifier flow in one direction takes place through an annular intake about a centre body which increases in cross section in the downstream direction. The centre body is shaped smoothly at one end but is bluff at the other end and the bluff periphery gives rise to turbulence when flow is in the reverse direction, the flow being deflected by the turbulent zone into an outer annular passage.

It is an object of the present invention to provide an improved fluid flow rectifier.

SUMMARY OF THE INVENTION

According to the present invention there is provided a fluid rectifier comprising ducting including three branches meeting at an intersection, the cross-sectional area of each one of the branches being substantially equal at said intersection.

The change in flow under different operating conditions may be effected by a cascade of guide vanes in cooperation with the configuration at the intersection.

The change in flow may be produced by an auxiliary flow of fluid derived from the main flow, such auxiliary flow being arranged to pass across the main flow and thereby deflect the latter to a desired outlet port.

Alternatively, the change in flow between two operating conditions may be produced by a baffle or other body which deflects the flow of fluid under one set of operating conditions, but does not deflect the flow or deflects the flow in a different manner under another set of operating conditions. This baffle may be substantially of diamond section and disposed at the intersection with the axis on the axis of symmetry of the rectifier.

The baffle or other body may be annular and of substantially triangular section with an outwardly directed apex and two inner radiused apices. In this construction, a deflector may lie downstream of the body (under one set of operating conditions) and may have substantially a W-shape in longitudinal section. The outer limbs of the W may form with the body, a channel of hollow frustoconical form which serves to produce a flow of fluid traversing the entry to that branch of the ducting acting as an inlet port under another set of operating conditions.

The ducting forming the rectifier may be sinuous in longitudinal section and a discontinuity in the ducting wall may serve to produce different flows under different operating conditions.

BRIEF DESCRIPTION OF THE DRAWINGS

FIG. 1A and 1B are longitudinal sections taken along the axis of symmetry of one half of the first embodiment of a fluid rectifier in accordance with the invention in which flows through the rectifier are in the general directions indicated by arrows A and B respectively;

FIG. 2 is a longitudinal section taken along the axis of symmetry of one half of a modification of the rectifier shown in FIGS. 1A and 1B;

Figure 3A:
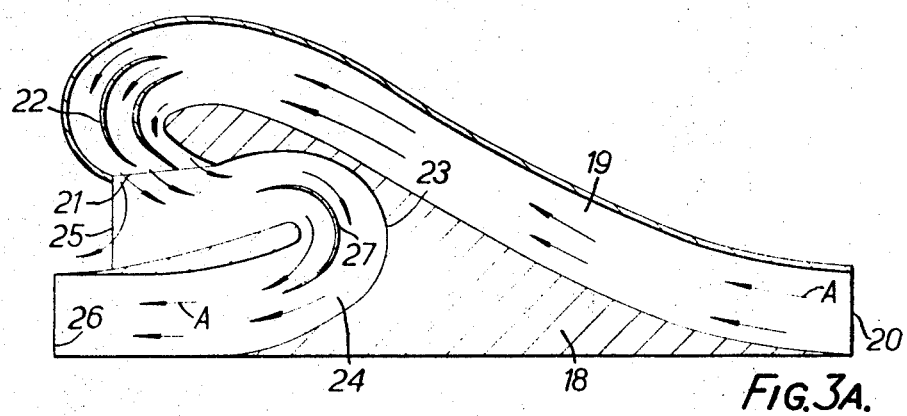
FIGS. 3A and 3B are longitudinal sections taken along the axis of symmetry of one half of a second embodiment of a fluid rectifier in accordance with the invention in which flows through the rectifier are in the general directions indicated by arrows A and B respectively.

The fluid rectifier shown in FIG. 1A and 1B comprises, on each side of the axis of symmetry, a duct 1 terminating in ports 2 and 3, an annular baffle 4 or other body and a deflector 5 forming the boundary walls of a passage 6, and a curved duct 7 having a port 8 at one end and communicating at its other end with the duct 1 in the region of the baffle 4. The baffle 4 is of generally isosceles triangular section with the apex 4' pointing towards the duct 7 and with the rounded corners 4" and 4'" spaced apart with one corner 4'" adjacent the deflector 5. The deflector 5 taken as a whole has a longitudinal section approximately in the shape of a letter W. Guide vanes 9 each of aerodynamic form and having a curvature approximating to that of the duct 7 are disposed within the duct 7 with their ends remote from the port 8 juxtaposed to the plane of intersection 10 between the ducts 1 and 7. A baffle or vane 11 of aerodynamic section is disposed within the duct 7 with its upstream edge adjacent the port 8, this baffle having a plane face opposite an enlarged and shaped portion 1' of the duct 1 and having a curved face opposite the wall of the duct 7. The duct 1 is enlarged in the region of the baffle 4 such that the plane of intersection 10 between the ducts 1 and 7 is inclined to the longitudinal axis of the duct 1. A narrow passage 11' is provided between the baffle 11 and the portion 1'.

On introduction of a fluid stream in the direction indicated by arrow A (first set of operating conditions), the fluid stream, as will be seen from FIG. 1A, flows over the deflector 5 and the baffle 4 and is discharged through the port 3. Flow past the plane of intersection 10 induces a secondary flow through the port 8 and the duct 7 and this secondary flow enters the duct 1 and passes to and out through the port 3. A portion of the flow from the port 2 enters the duct 7 and flows through the passage 11' and over the outer periphery of the duct portion 1' in the region of the port 3. Furthermore, a circulatory flow occurs around the baffle 4 and through the passage 6, defined in part by the deflector 5.

Upon introduction of a fluid stream through the port 3 in the direction indicated by arrow B (second set of operating conditions), the fluid stream, as will be seen from FIG. 1B, is directed by the baffle 4 into the duct 7 and with the aid of the guide vanes 9, and is smoothly emitted through the port 8. A minor portion of the fluid stream enters the passage 6 and is also directed, by the deflector 5, across the duct 1 into the duct 7. This auxiliary minor portion of the fluid stream thus acts as a fluid baffle to any fluid tending to pass to the port 2. It has been found by experiment that on introduction of the fluid stream through port 3, substantially no flow passes to the port 2.

Thus, while the fluid rectifier permits flow from the port 2 to the port 3, the baffle 4 and deflector 5 offer a high resistance to flow in the direction indicated by arrow B and cause a flow from the port 2 to issue through port 8. It will be noted that at the intersection of the three ducts the cross sections are all approximately equal.

In the modification shown in FIG. 2, the baffle 4 and the deflector 5 shown in FIGS. 1A and 1B are replaced by a single baffle 14 which is approximately diamond shape in longitudinal section. The longer axis of the baffle 14 lies on the axis of symmetry of the rectifier. The baffle 14 includes an annular step 15 which, on the occurrence of a flow in the direction indicated by arrow B, directs a minor portion of the fluid stream which has been flowing over the upstream portion of the baffle 14 towards and into the duct 7. The step 15 lies substantially in the same plane as the terminal plane of that part of the ducting which communicates with inlet port 3 under the second operating conditions.

The operation of this modification of FIG. 1 is much the same as in the first embodiment, and again it will be noted that at the intersection of the ducts, the cross-sectional areas of the ducts are approximately equal.

Figure 3B:
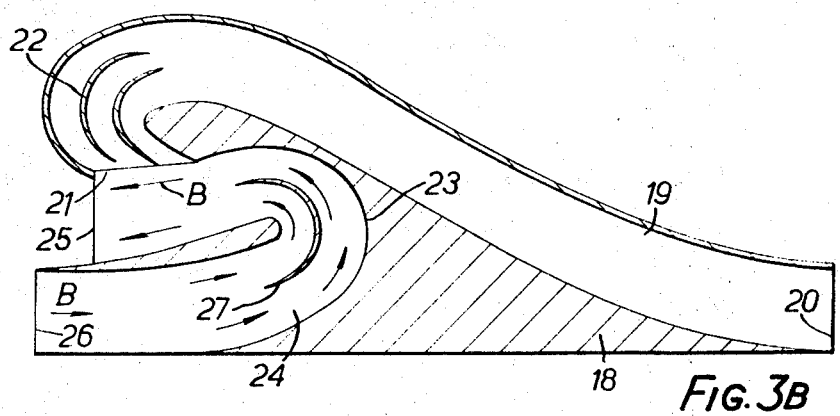

The fluid rectifier shown in FIGS. 3A and 3B includes on each side of the axis of symmetry a central baffle member 18 which defines one boundary wall of a duct 19 terminating in ports 20 and 21. Curved guide vanes 22 are disposed at the end of the duct 19 adjacent the port 21. The baffle member 18 includes a concave surface 23 which defines one wall of a duct 24 of approximately U-shape in longitudinal section terminated by ports 25 and 26. The duct 19 communicates with the duct 24 at the plane of intersection defined by the port 21. A curved guide vane 27 is disposed within the duct 24.

As will be seen from FIG. 3A, upon the introduction of a fluid stream in the direction indicated by arrow A, the fluid stream passes through the duct 19 which curves away gently from the axis of symmetry and by means of the guide vanes 22 positioned in a part of the duct which curves sharply towards the axis is directed into the duct 24 from which it is emitted at the port 26. A portion of the stream adjacent the outer wall of the duct 19 does not enter the duct 24 but flows out of the port 25 and flows along the outer periphery of the wall of the duct 24 adjacent the port 26. As indicated in FIG. 3B, on the introduction of the fluid stream in the direction indicated by arrow B through the port 26 the fluid passes through the duct 24 and is directed by the guide vane 27 towards and out of the port 25. The flow past the port 21 will induce a partial flow through the duct 19. Thus, the fluid rectifier permits flow from port 20 to 26 but, owing to the high resistance of flow brought about by the concave surface 23 of the baffle member 18 which deflects a minor proportion of the total flow away from the port 21 and thus total flow from the port 26 to the port 20 is substantially prevented. Again it will be noted that the cross section of each duct adjacent the intersection of the ducts is approximately the same.

Figure 4:
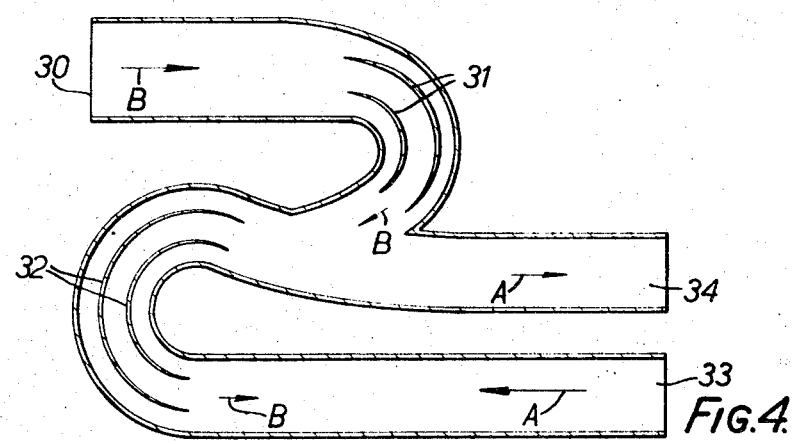
FIGS. 4 and 5 are longitudinal sections of third and fourth embodiments of fluid rectifiers in accordance with the invention.

In the fluid rectifier shown in FIG. 4, a fluid stream admitted through a port 30 leading to a converging duct is encouraged by baffles 31 and 32 to pass to a port 33. Contrariwise, a fluid stream admitted to the rectifier at the port 33 is encouraged by the baffles 32 to be emitted at port 34, the baffles 31 being spaced from this reverse flow path. In longitudinal section the rectifier is generally sinuous and the outlet port 34 communicates at the intersection midway between the crest and trough of the sinuous configuration.

The ducting communicating with the port 30 is effectively of J-shape in longitudinal section, the ducting communicating with ports 33 and 34 is essentially U-shaped and the ducting communicating with the port 30 and part of the ducting communicating with the port 33 up to the intersection together from an S-shape in longitudinal section.

Figure 5:
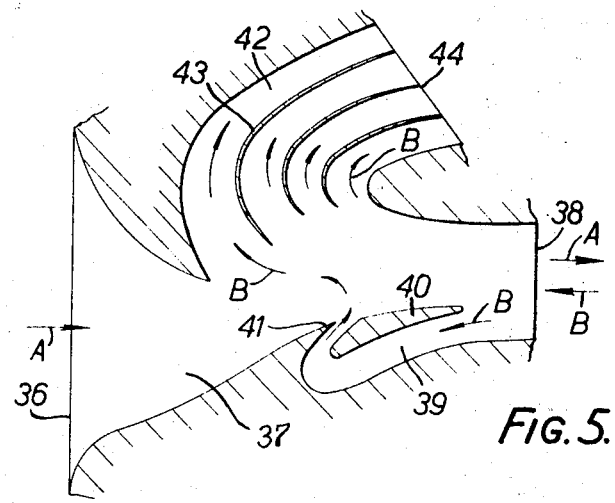

In the rectifier shown in FIG. 5, fluid admitted at port 36 as indicated by arrows A passes directly through a duct 37 to a port 38. This flow is indicated by the arrows A. Upon a flow of fluid from the port 38, as indicated by the arrows B, a minor portion of the fluid stream enters a relatively narrow passage 39 defined between an aerofoil baffle or vane 40 and one wall of the duct 37. The passage 39 terminates at a cusp 41 which directs the fluid passing through the passage 39 across the duct 38 and into the duct 42 where it is directed by guide vane 43 to pass out of a port 44. In this embodiment flow into the duct 42 is deflected primarily by means of the flow directed across the duct from the passage 39 and cusp 41. Again, the cross section of each duct at the intersection is approximately the same.

Figure 6:
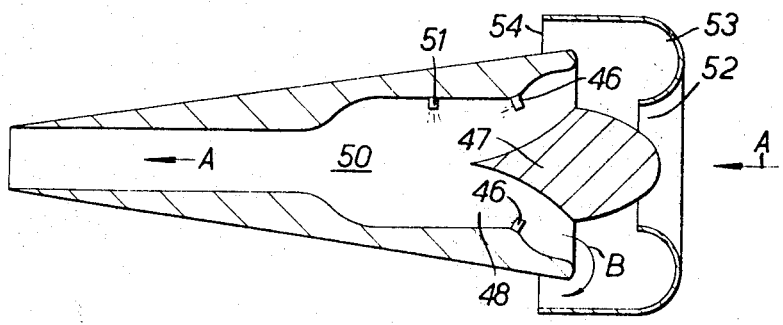
FIG. 6 is a longitudinal section of a pulse jet motor incorporating a fluid rectifier in accordance with the invention.

As illustrated in FIG. 6, fluid rectifiers such as herein described may be incorporated in a pulse jet unit, thus obviating the necessity for any moving mechanical parts in the unit. In the embodiment shown in FIG. 6, fuel injection nozzles 46 are mounted opposite a baffle 47 in the form of a centre body and an annular port 48 downstream of the fuel nozzles communicates with a combustion chamber 50 having a fuel igniter 51. In such an arrangement, during induction, air is admitted through an annular inlet port 52 in the direction of arrow A and passes the fuel nozzles 46 and the port 48 to reach the combustion chamber 50 of the pulse jet. On combustion of the fuel/air mixture and the resulting expansion, the combustion products tend to enter the rectifier through the port 48 and are directed by a concave generally conical wall of the baffle 47 into an annular duct 53 and are exhausted through an annular outlet port 54. During induction, a portion of the air admitted through the port 52 will pass via the duct 53 and the port 54 over the outer periphery of the wall of the combustion chamber to cool the same. Such a pulse jet unit may be used as a propulsion unit for a model aircraft. Alternatively, such a unit may be carried by conventional aircraft as an auxiliary power unit to provide power for the aircraft should one or more main engines fail. A pulse jet unit as described may also be used to propel small missiles more economically than can be achieved by using rocket motors or turbojet units.

Figure 7:
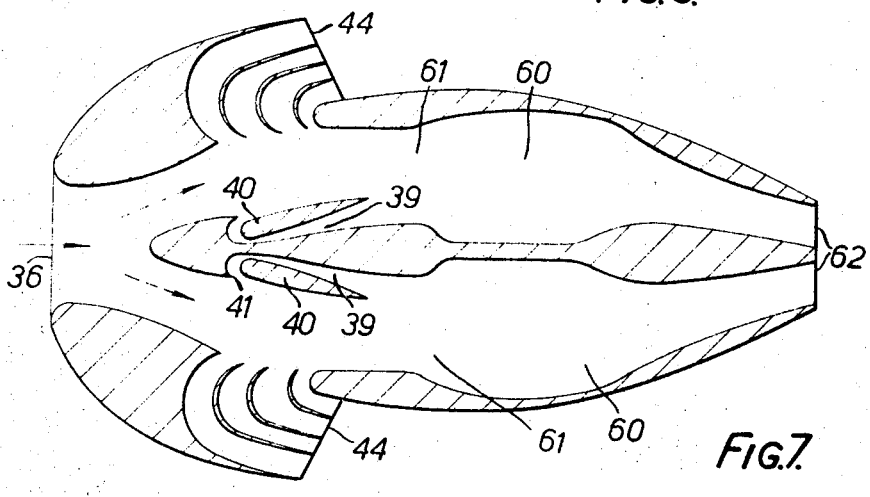
FIG. 7 is a longitudinal section through a combustion chamber assembly incorporating rectifiers as shown in FIG. 5.

Fluid rectifiers in accordance with the present invention may also be incorporated in pressure-generating combustion systems. Pressure-generating combustion systems incorporating fluid rectifiers in accordance with the invention may be used in gas turbine engines to replace orthodox steady-flow constant pressure combustion chambers. In such an arrangement, the pressure loss normally associated with combustion will be at least reduced or be replaced by a rise in total or stagnation pressure without introducing any additional moving mechanical parts. Such an arrangement would, in effect, comprise a valveless pulse jet interposed between the compressor outlet and turbine inlet. In a cannular assembly of combustion chambers, the rectifier may supply the single common air inlet of said combustion chambers, the inlet flow being switched automatically as a consequence of a blockage to improve inflow immediately following an explosion in a combustion chamber of the arrangement. Such an arrangement is shown in FIG. 7 in which a device comprising two adjacent combustion chambers 60 is fitted with rectifiers as shown in FIG. 5. In the arrangement shown in FIG. 7, provided sufficient combustion chambers 60 are used, flow through the inlet 36 to the rectifiers will be substantially steady as will the flow emitted from the outlet 62.

Figure 8:
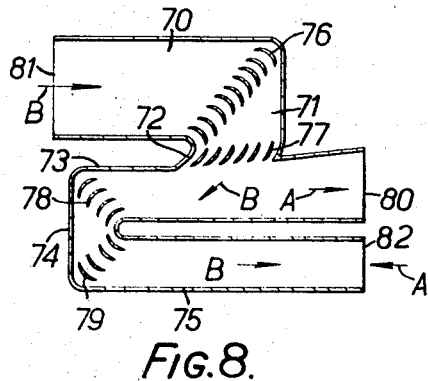
FIG. 8 is a section through a fifth embodiment of a rectifier in accordance with the invention.

In the fifth embodiment illustrated in FIG. 8, the generally S-shaped continuously curving ducting is replaced by ducting sections 70, 71, 72, 73, 74, 75, the angles between the sections being provided with cascaded blades 76, 77, 78, and 79 to ensure smooth flow. In overall shape the rectifier has the shape of a squared letter S (mirrored in FIG. 8) with the intermediate transverse bar of the S provided with a port 80. Considered from another aspect, the ducting sections 73, 74 and 75 may be likened to a letter U whilst the sections 70 and 71 likened to a letter J. The other ports 81 and 82 are provided at the two ends of the letter S. The provision of cascaded blades at mitred corners, as in this embodiment, particularly if the spacing of the blades of each cascade is properly selected, reduces pressure loss. The two flow modes are illustrated in FIG. 8 as indicated by the arrows A and B. At the intersection of the three ducts, the cross-sectional areas are the same.

Figure 9:
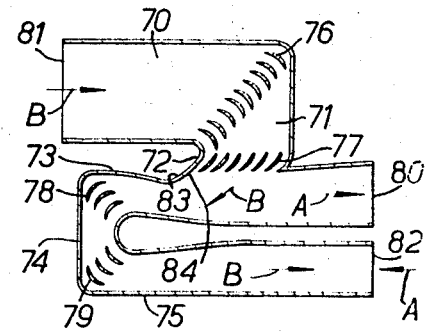
FIG. 9 is a longitudinal section of a sixth embodiment.

The embodiment of FIG. 9 is generally similar to that of FIG. 8 and like parts have been given the same reference numerals. The difference lies in the provision of a convergent-divergent portion 83 in the duct 73 and a smoothly curved wall 84 joining the duct 73 and the duct 72.

Figure 10:
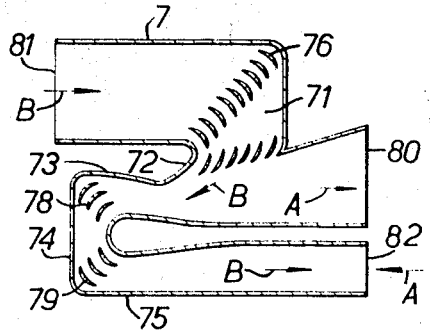
FIG. 10 shows a modification of the fifth embodiment.

The embodiment of FIG. 10 is again generally the same as that of FIG. 9 but the downstream edges (when the flow is in the direction of the arrow B) of the cascade of blades 77 lie on an imaginary surface which effectively forms a continuation of the surface of the duct wall 73. This arrangement takes advantage of the Coanda effect and reverse flow through the inlet port 81 is thereby substantially prevented.

Figure 11:
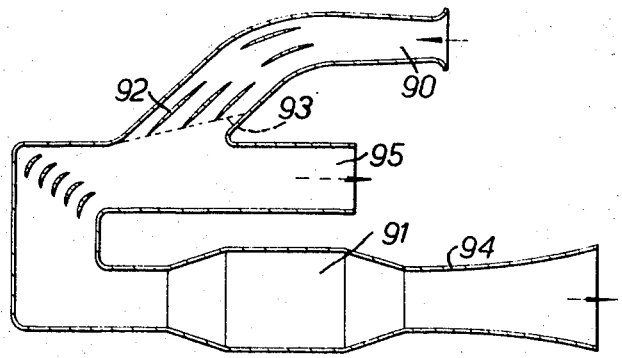
FIG. 11 is a diagram illustrating the use of a rectifier in accordance with the invention as applied to a crop drier.

In the crop-drying arrangement illustrated in FIG. 11 cool air is drawn over the crops in duct 90, this air constituting combustion air for the combustion chamber providing hot air for the drying process. This arrangement also makes use of the Coanda effect and the blades of cascade 92 terminate along an imaginary inclined broken line 93. The remainder of the crop drier includes the combustion chamber 91 with an outlet venturi 94 and a secondary, reverse flow outlet 95.

Fluid rectifiers in accordance with this invention may be used in control systems such as one in which a flow of fluid in one direction is to be prevented. In one such control system (not illustrated) a fluid rectifier is positioned within the flow path of fluid passing from a pressure source to a pressurised system. The fluid rectifier permits flow in the correct direction but should a pressure drop occur within the pressure source such as to cause a flow from the system towards the source, the rectifier prevents flow to the source and directs the flow into a passageway which terminates at a control port of a fluid amplifier. Flow through the control port switches a fluid stream of the amplifier away from the normal discharge passage and into a further outlet passage which terminates at a servosystem which serves to restore the pressure within the pressure source.

In an alternative control system (likewise not illustrated), a fluid rectifier in accordance with this invention may be incorporated within a pipeline to protect delicate instrumentation located upstream of the fluid rectifier. In such a system the fluid rectifier permits flow to pass from the region of the instrumentation to a user device downstream of the rectifier. Should an explosion occur within the pipeline downstream of the rectifier, the products of the explosion and any shock waves induced by the explosion would be prevented from passing to the instrumentation and be directed by the rectifier to a dump tank.

The fluid rectifier shown in FIG. 5 can be used as a means of replacing forced and/or induced draught fans in, for example, the combustion systems of steam turbine boilers heating systems, and furnaces.

It is to be understood that in each of the fluid rectifiers shown in FIGS. 1A to 3B, the rectifiers can be asymmetric. For example, a complete rectifier may be as shown in any one of the FIGS. In the embodiment of FIGS. 1A and 1B, for example, the duct 1 may be of rectangular or square cross section and have one or more rectangular ducts 8 in communication therewith. The duct 1 may also be circular or part annular in cross section and have one or part annular ducts 8 in communication therewith or a coaxial annular duct 8 extending around the periphery of the duct 1 and communicating therewith.

In a modification of the embodiment illustrated in FIG. 5 the continuously curving duct leading to the port 44 is replaced by a mitred corner with a cascade of blades at the corner as shown for example at 76 in FIG. 8. Furthermore, in this modification shortened guide blades are provided in the duct leading to port 44 at and adjacent the intersection with the other ducts.

I claim:
1. In a fluid rectifier comprising ducting including:
three branches meeting at an intersection, each branch having a port remote from the intersection;
one said port acting as a fluid inlet;
a second said port acting as a fluid outlet and a negligible or small flow passing through the third port under one set of operating conditions;
the inlet, outlet and negligible or small flow function of the ports being differently distributed under another set of operating conditions, that port acting as an inlet under the first set of operating conditions having at most only a small flow under the second-mentioned set of operating conditions; and
said rectifier further comprising a cascade of guide vanes at said intersection, said cascade of guide vanes and the geometry of the ducting at the intersection serving to produce said different distribution under the aforesaid two operating conditions.
2. A fluid rectifier comprising:
three ducting branches meeting at an intersection, each branch having a port remote from the intersection;
a first said port acting as a working fluid inlet;
a second said port acting as a working fluid outlet;
a third said port receiving at most only a small flow of working fluid under one operating condition;
said outlet port of the first operating condition acting under a second operating condition as an inlet port;
the inlet port of the first operating condition receiving at most only a small flows;
the third port receiving at most only a small flow under the first operating condition acting as an outlet port under the second operating condition; and
said rectifier further comprising means for creating under the second operating condition a deflecting flow formed from a minor proportion of the main fluid flow, the deflecting flow serving substantially to prevent flow into the inlet port of the first operating condition.
3. A fluid rectifier according to claim 2:
wherein the ducting is sinuous in longitudinal section; and
wherein the ducting includes a discontinuity arranged to deflect fluid to the third port under the said other set of operating conditions.
4. A fluid rectifier according to claim 2, wherein two said branches together form a passage of U-shape of which the bend exceeds 180° and the other branch is of generally J-shape with the shorter limb of the J meeting one of the U-shaped branches at the said intersection in such a manner that the curved portions of both letters together form a substantially S-shape.
5. A fluid rectifier according to claim 2, wherein two said branches are together of generally U-shaped configuration, one limb of the U having a convergent-divergent portion with one wall of the divergent section leading into one wall of the other branch, a cascade of guide blades extending across the intersection of the said other branch with the said one limb of the U and arranged, when said other branch acts as a fluid inlet to direct the fluid into said convergent-divergent portion and thence through the other limb of the U.
6. A fluid rectifier according to claim 2 wherein two of said branches are substantially alined said rectifier further comprising a body disposed in the ducting at the intersection, said body being so shaped that it permits straight through flow from the inlet port to the outlet port through the alined branches under the first operating conditions while under the second operating conditions the outlet port under the first operating conditions acts as an inlet port and produces a total flow which is deflected by the minor proportion of the flow itself deflected by said body into the branch leading to the third port.
7. A fluid rectifier according to claim 6, wherein said body is annular and is of substantially triangular section, said section including an outwardly directed apex and two inner radiused apices and said rectifier further includes a deflector which lies downstream of the said body under the second set of operating conditions, said deflector having a substantially W shape in longitudinal section, with the outer limbs of the W forming with the said body a channel of hollow frustoconical form which serves to produce a flow of fluid traversing the entry to the branch acting as an inlet port under the first set of operating conditions and fluid therefrom flows towards the third port thus substantially inhibiting flow of fluid to the branch of the inlet port of the first operating conditions.
8. A fluid rectifier according to claim 6 wherein:
said body is of substantially diamond section and is disposed at the intersection with its longer axis on the axis of symmetry of the rectifier;
said body having an annular step facing upstream towards the inlet port and branch under said other set of operating conditions; and
said step being disposed substantially in the same plane as the terminal plane of that branch of the ducting which communicates with that one of the ports which acts as an inlet port under said other set of operating conditions.

9. A fluid rectifier according to claim 8, wherein the branch leading to the third port curves substantially through 180° and said rectifier further comprises a plurality of guide vanes in the branch leading to the third port.

10. A fluid rectifier according to claim 2, comprising an aerofoil blade extending alongside one wall of the ducting at said intersection and lying opposite the entry to the branch communicating with the third port, said aerofoil vane lying in a recess formed in the ducting wall and defining with the ducting wall a channel which, in operation generates an auxiliary fluid flow under the said second operating conditions which flow is deflected to pass transversely across the entry to the branch of the inlet port of the first operating conditions whereby flow to said port is inhibited and flow to the third port is produced.

11. A fluid rectifier according to claim 10 comprising means defining a cusp at the termination of the channel.